US010951703B1

(12) United States Patent
Ghosh et al.

(10) Patent No.: US 10,951,703 B1
(45) Date of Patent: Mar. 16, 2021

(54) PEER-TO-PEER EMAIL CONTENT REPLICATION AND SYNCHRONIZATION

(71) Applicant: Microsoft Technology Licensing, LLC, Redmond, WA (US)

(72) Inventors: Kushal Ghosh, Bangalore (IN); Nikhil Kalu, Bangalore (IN); Phaneendra Kumar Dwadasi, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/601,724

(22) Filed: Oct. 15, 2019

(51) Int. Cl.
| | |
|---|---|
| G06F 15/16 | (2006.01) |
| H04L 29/08 | (2006.01) |
| H04L 12/58 | (2006.01) |
| G06F 16/27 | (2019.01) |

(52) U.S. Cl.
CPC .......... H04L 67/1095 (2013.01); G06F 16/27 (2019.01); H04L 51/22 (2013.01); H04L 51/24 (2013.01); H04L 67/104 (2013.01); H04L 67/22 (2013.01)

(58) Field of Classification Search
CPC ........ G06F 16/27; H04L 51/22; H04L 51/24; H04L 67/22
USPC ...................................................... 709/206
See application file for complete search history.

(56) References Cited

U.S. PATENT DOCUMENTS

| | | |
|---|---|---|
| 6,983,308 B1 | 1/2006 | Oberhaus et al. |
| 7,562,151 B2* | 7/2009 | Kaler ................. H04L 67/104 370/390 |
| 7,849,140 B2 | 12/2010 | Abdel-Aziz et al. |
| 8,019,900 B1 | 9/2011 | Sekar et al. |
| 8,171,081 B1* | 5/2012 | Wang ................. G06F 16/10 709/204 |
| 8,676,155 B2* | 3/2014 | Fan ..................... H04W 4/14 455/406 |
| 9,166,941 B2 | 10/2015 | Glickstein et al. |
| 9,299,056 B2 | 3/2016 | Kallman et al. |
| 9,591,069 B2* | 3/2017 | Thornburgh ........ H04L 65/4084 |
| 9,961,032 B2* | 5/2018 | Blinder ................. H04L 51/22 |

(Continued)

OTHER PUBLICATIONS

"FlowingMail: A Decentralized, Secure, Encrypted Email System", Retrieved From https://web.archive.org/web/20190712180846/http:/flowingmail.com/, Jul. 12, 2019, 2 Pages.

(Continued)

Primary Examiner — Anthony Meija
(74) Attorney, Agent, or Firm — Liang IP, PLLC

(57) ABSTRACT

Techniques of peer-to-peer email synchronization are disclosed herein. In one embodiment, a technique includes transmitting, from a first client device to an email server, a synchronization request to synchronize an email between the email server and the first client device. In response, the first client device receives a reply containing data representing a replicate identification of email content of the email and identification of a second client device at which a copy of the email content is present. Upon receiving the reply, the first client device can establish a peer-to-peer communications channel with the second client device, download a copy of the email content of the email from the second client device instead of the email server, and surface the downloaded email content in an email client on the first client device to a user.

20 Claims, 9 Drawing Sheets

(56) References Cited

U.S. PATENT DOCUMENTS

| | | | | |
|---|---|---|---|---|
| 10,567,500 | B1* | 2/2020 | Leshinsky | H04L 69/40 |
| 2004/0064511 | A1* | 4/2004 | Abdel-Aziz | H04L 51/066 |
| | | | | 709/206 |
| 2005/0065632 | A1* | 3/2005 | Douglis | H04L 29/06 |
| | | | | 700/200 |
| 2007/0050454 | A1* | 3/2007 | Zanter | H04L 29/12594 |
| | | | | 709/206 |
| 2007/0094334 | A1* | 4/2007 | Hoffman | G06Q 10/107 |
| | | | | 709/206 |
| 2008/0189440 | A1 | 8/2008 | Goyal et al. | |
| 2009/0144380 | A1* | 6/2009 | Kallman | H04L 51/04 |
| | | | | 709/206 |
| 2009/0157829 | A1* | 6/2009 | Choi | G06Q 10/107 |
| | | | | 709/206 |
| 2009/0300071 | A1 | 12/2009 | Arcese et al. | |
| 2010/0281127 | A1* | 11/2010 | Serdy, Jr. | H04L 51/38 |
| | | | | 709/206 |
| 2012/0150975 | A1* | 6/2012 | Kallman | G06Q 30/0272 |
| | | | | 709/206 |
| 2012/0173655 | A1* | 7/2012 | McEntee | G06F 16/1834 |
| | | | | 709/216 |
| 2012/0259928 | A1* | 10/2012 | Deshpande | H04L 51/14 |
| | | | | 709/206 |
| 2014/0122658 | A1* | 5/2014 | Haeger | H04L 67/1091 |
| | | | | 709/219 |
| 2014/0164946 | A1* | 6/2014 | Brown | H04L 51/22 |
| | | | | 715/752 |
| 2014/0379814 | A1* | 12/2014 | Graff | H04M 1/72547 |
| | | | | 709/206 |
| 2015/0341300 | A1* | 11/2015 | Swain | G06F 16/287 |
| | | | | 707/738 |
| 2016/0036872 | A1* | 2/2016 | Lappin | H04L 12/185 |
| | | | | 709/204 |
| 2016/0321338 | A1* | 11/2016 | Isherwood | H04L 67/1097 |
| 2019/0207892 | A1* | 7/2019 | Handte | H04L 51/22 |

OTHER PUBLICATIONS

"How New Nodes Synchronize with Ledger?", Retrieved From https://bitcoin.stackexchange.com/questions/74762/how-new-nodes-synchronize-with-ledger, Retrieved Date: Jul. 25, 2019, 2 Pages.

"Mail Clients", Retrieved From https://www.ibm.com/support/knowledgecenter/en/SSKTMJ_8.5.3/com.ibm.help.domino.admin85.doc/H_MAIL_CLIENTS.html, Retrieved Date: Jul. 25, 2019, 2 Pages.

"Sync Dev: Envisioning Decentralized Peer-To-Peer Email", Retrieved From https://www.resilio.com/blog/sync-dev-envisioning-decentralized-peer-to-peer-email, Nov. 20, 2014, 6 Pages.

Mislove, Alan E., "POST: A Decentralized Platform for Reliable Collaborative Applications", In Thesis of Rice University, Dec. 2004, 79 Pages.

Poremsky, Diane, "Synchronizing Outlook on Two Computers", Retrieved From https://web.archive.org/web/20190607143631/https://www.slipstick.com/outlook/sync-outlook/synchronizing-outlook-on-two-machines/, Jun. 7, 2019, 25 Pages.

"International Search Report and Written Opinion Issued in PCT Application No. PCT/US20/052348", dated Dec. 17, 2020, 13 pages.

* cited by examiner

PEER-TO-PEER EMAIL CONTENT REPLICATION AND SYNCHRONIZATION

BACKGROUND

Electronic Mail or "email" is a communications technique based on exchanging electronic messages among users via computers, smartphones, or other suitable types of client devices across computer networks such as the Internet or an intranet. Today's email systems typically operate on a store-and-forward model utilizing email servers to receive, forward, and store emails to corresponding users. For instance, upon receiving an incoming email to a user, an email server can store a copy of the incoming email and transmit a notification to the user indicating reception of the incoming email. In turn, the user can use an email client executing on a client device to connect to the email server in order to retrieve a copy of the incoming email. The email client can then render and present the retrieved incoming email to the user at the client device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to the store-and-forward model, to send and receive email messages, a client device can execute a standalone client application (e.g., Microsoft® Outlook), a webmail client (e.g., Gmail®) in a web browser, or other suitable types of email client to send/retrieve emails from email servers. The email client can then surface retrieved emails to a user via a user interface. The user can then read, flag, reply, delete, or perform other suitable actions on the surfaced emails via the user interface. The email client can then perform suitable operations, such as transmitting or synchronizing copies of emails with an email server, to carry out the user actions.

Under certain scenarios, synchronizing emails between an email client on a client device with an email server may experience certain difficulties. For example, when a large number of email clients attempt to synchronize with an email server at the same time, a lack of network bandwidth, compute resource, or input/output capacity may render such synchronization sluggish or even fail completely. In another example, client devices may have limited compute resources or slow network connections to the email server. As such, synchronization with the email server may experience high synchronization latency or even failure. Such difficulties related to synchronization of emails can negatively impact user experience with an email service provided by the email server.

Several embodiments of the disclosed technology can address at least some of the foregoing difficulties by implementing a content replicator to enable peer-to-peer email content replication and synchronization among client devices. In certain implementations, a content replicator can be implemented on an email server, for instance, as a component operatively coupled to other components of the email server configured to implement various functions of the Internet Message Access Protocol ("IMAP"), Post Office Protocol ("POP"), Simple Mail Transfer Protocol ("SMTP"), or other suitable email protocols. In other implementations, the content replicator can be implemented as a standalone application, a computing service, or have other suitable configurations.

The content replicator can be configured to track a synchronization status of email content of emails received, sent, and/or otherwise stored at the email server. For example, upon detecting an incoming email is received at the email server, the content replicator can be configured to assign a replica ID to email content of the incoming email. The replica ID can include an alphanumerical, numerical, or other suitable string that uniquely or distinctly identifies the email content of the incoming email. The content replicator can also be configured to create and store in a database a content record having the replica ID corresponding to the email content of the incoming email. During operation, upon detecting that a first user connects to the email server with a first client device and successfully downloads a copy of the incoming email to the first client device, the content replicator can be configured to update the corresponding content record indicating that a copy of the email content of the incoming email is available at the first client device corresponding to the first user.

Subsequently, the content replicator can detect reception of a synchronization request from a second client device of a second user (or another client device of the first user) for the same incoming email when, for instance, the second user is a co-recipient or sender of the incoming email. In response, the content replicator can be configured to lookup the corresponding content record and determine that a copy of the email content is already present at the first client device of the first user. As such, instead of transmitting a complete copy of the incoming email to the second user, the content replicator can be configured to generate a truncated email of the incoming email (referred to herein as "truncated email") without the email content. Instead, the truncated email can have a header of the incoming email and metadata (i) identifying that the first client device of the first user has a copy of the email content, and (ii) an instruction to initiate peer-to-peer download of the email content from the first client device of the first user. The metadata can also include, for instance, a network address (e.g., an IP address), a device ID, or other suitable information regarding the first client device.

Upon receiving the truncated email from the email server, the second client device of the second user can initiate peer-to-peer communication with the first client device of the first user for a copy of the email content. Various peer-to-peer communication protocols may be used for communication between the first and second client devices. Example peer-to-peer protocols may include the Systems Network Architecture ("SNA"), Advanced Peer-to-Peer Networking ("APPN"), BitTorrent, Internet File Transfer ("giFT"), and OpenFT protocol. In one example, the second client device can be configured to transmit, via a computer network, a request for connection to the first client device at the IP address of the first client device. Upon successful handshaking and/or other authentication and authorization operations, the first client device can be configured to provide a copy of the email content to the second client device according to the replica ID. Upon receiving the copy of the email content from the first client device, an email client at the second client device can be configured to combine the header from the truncated email with the email content retrieved from the first client device. The email client can then render and surface the combined complete copy of the incoming email at the second client device to the second user.

Optionally, the email client at the second client device can also transmit a notification to the content replicator at the email server indicating that another copy of the email content is now available at the second client device. In response, the content replicator can be configured to update the corresponding content record accordingly. Subsequently, when another synchronization request for the same incoming email is detected from a third client device of a third user, in certain embodiments, the content replicator can be configured to select one of the first or second client device as a source of the email content based on, for instance, a current availability, network accessibility, and/or other status of the first and second client devices. In other embodiments, the content replicator can identify to the third client device all the client devices that each have a copy of the email content. Based on the identification of all the client devices, the third client device can initiate a peer-to-peer session with one, some, or all of the identified client devices simultaneously or serially to retrieve a copy of the email content.

Several embodiments of the disclosed technology can thus allow efficient and speedy replication and synchronization of email content to email clients at multiple client devices. Instead of all client devices retrieving copies of the same email content from the email server, the email content can be shared among client devices in a peer-to-peer fashion. As such, a load placed on network bandwidth and compute resources of the email server can be reduced. Also, a computer network (e.g., a local area network) that interconnects the client devices may have higher network bandwidth and/or connection speed than another computer network (e.g., the Internet) connecting the client devices to the email server. As a result, retrieving a copy of the email content from another client device on the same local area network can be faster than retrieving from the email server. Thus, network latencies of retrieving copies of the email content at the client devices may be reduced as well to improve user experience of the email service.

DETAILED DESCRIPTION

Figure 1:
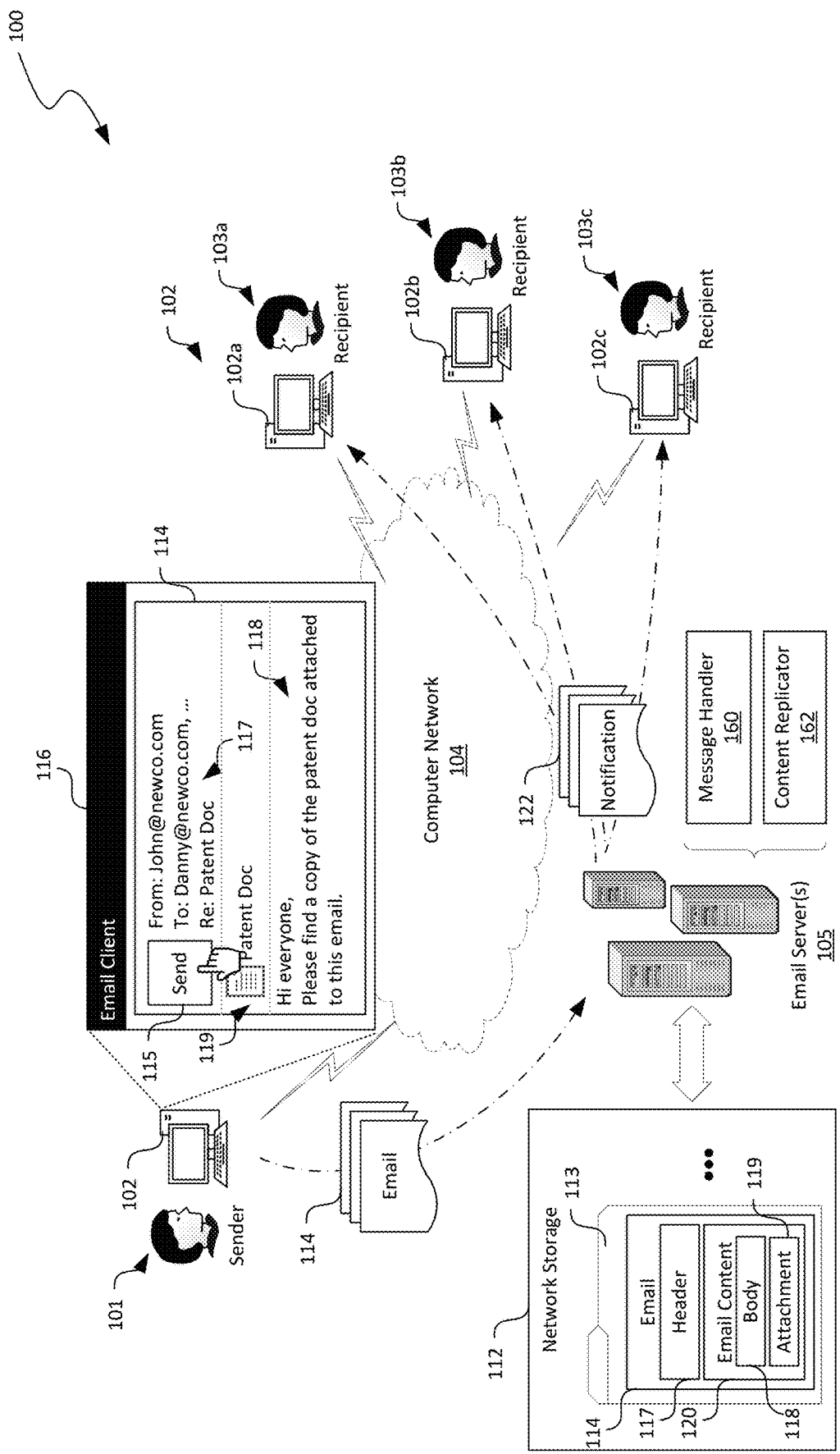
FIG. 1 is a schematic diagram illustrating a computing system implementing peer-to-peer email content replication and synchronization in accordance with embodiments of the disclosed technology.

Certain embodiments of systems, devices, components, modules, routines, data structures, and processes for implementing peer-to-peer message content replication and synchronization are described below. In the following description, email content synchronization is used as examples to illustrate certain aspects of the disclosed technology. However, aspects of the disclosed technology can also be implemented in collaboration applications, instant message systems, and/or other suitable communication systems. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "email server" generally refers to a computer server dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. One example email server can be an Exchange server provided by Microsoft Corporation of Redmond, Wash. As used herein, an "inbox" is a file folder configured to contain data representing incoming emails for a user. The email server can also maintain and/or access one or more outboxes configured to contain outgoing emails, sent mailbox configured to contain previously sent emails, and/or other suitable mailboxes.

Also used herein, a "peer-to-peer" or "P2P" communication generally refers to a computing or networking architecture that partitions tasks or workload of an application among computing devices as peers. Peers are equally privileged, equipotent participants in execution of the application. During operation, peers can make available a portion of computing resources, such as processing power, disk storage, or network bandwidth, directly to other peers without central coordination by servers or stable hosts. Various protocols may be implemented to establish a peer-to-peer communications channel. Example peer-to-peer protocols may include the Systems Network Architecture ("SNA"), Advanced Peer-to-Peer Networking ("APPN"), BitTorrent, Internet File Transfer ("giFT"), and OpenFT protocol.

As used herein, the term "email content" generally refers to data representing suitable information included in an email. In some examples, email content can include data representing text data in a body section of the email. In other examples, email content can also include data representing an attachment of a document, photo, video, spreadsheet, or other suitable types of file. In further examples, email content can further include embedded media data, such as inline documents, photos, videos, etc. in a body section of an email. In yet further examples, the email content can also include metadata and/or other suitable types of data.

Today's email systems typically operate on a store-and-forward model utilizing email servers to receive, send, forward, and store emails to corresponding users. According to the store-and-forward model, email clients at client devices can retrieve copies of incoming and/or sent emails via synchronization with email servers. However, under certain scenarios, synchronizing emails between an email client on a client device with an email server may experience certain difficulties. For example, when a large number of email clients attempt to synchronize with an email server at the same or within a short time period, a lack of network bandwidth, compute resource, or input/output capacity may render such synchronization sluggish or even fail completely. Such difficulties related to synchronization of emails can negatively impact user experience of the email service.

Several embodiments of the disclosed technology can address at least some of the foregoing difficulties by implementing a content replicator to enable peer-to-peer email content replication and synchronization among client devices. For instance, the content replicator can be configured to track a replication or synchronization status of email content of emails received, sent, and/or otherwise stored at the email server. Based on the tracked synchronization status, the content replicator can be configured to instruct client devices to retrieve copies of email content from other peer client devices instead of from the email server. As such, a load of network bandwidth and compute resources placed on the email server can be reduced. Also, a computer network (e.g., a local area network) that interconnects the client devices may have higher network bandwidth and/or speed than another computer network (e.g., the Internet) connecting the client devices to the email server. As a result, retrieving a copy of the email content from another client device on the same local area network can be faster than retrieving from the email server. Thus, network latencies of retrieving copies of the email content at the client devices may be reduced to improve user experience, as described in more detail below with reference to FIGS. 1-5.

FIG. 1 is a schematic diagram illustrating an example computing system 100 implementing peer-to-peer email content replication and synchronization in accordance with embodiments of the disclosed technology. As shown in FIG. 1, the computing system 100 can include a computer network 104 interconnecting multiple client devices 102 and one or more email servers 105 (referred to as "email server 105" herein for simplicity). The email server 105 is also interconnected with a network storage 112 containing data of emails organized as inboxes 113 or other suitable types of email folders corresponding to one or more sender 101 and recipients 103. Only one inbox 113 is shown for clarity in FIG. 1. Though not shown in FIG. 1, the network storage 112 can also include a "Sent items," "Deleted Items," "Outbox," "Junk Email," and/or other suitable types of email folders for each of the one or more sender 101 and the recipients 103. The foregoing individual email folders can have a corresponding copy residing on the client devices 102. During operation, the email server 105 can facilitate synchronization of the emails folders at the network storage 112 and those on the client device 102.

The computer network 104 can include an intranet, a wide area network, the Internet, or other suitable types of network. Even though particular components of the computing system 100 are shown in FIG. 1, in other embodiments, the computing system 100 can also include additional and/or different components or arrangements. For example, in certain embodiments, the computing system 100 can also include additional network storage devices, network devices, and/or other suitable components (not shown).

The client devices 102 can each include a computing device that facilitates a corresponding sender 101 or recipient 103 to access email and/or other suitable types of computing services provided by the email server 105 via the computer network 104. In the illustrated embodiment, the client device 102 includes a desktop computer. In other embodiments, the client device 102 can also include a laptop computer, tablet computer, or other suitable computing device. Even though only one sender 101 and three recipients 103 (identified as first, second, and third recipients 103a-103c, respectively) with corresponding first, second, and third client devices 102a-102c are shown in FIG. 1 for illustration purposes, in other embodiments, the computing system 100 can facilitate any suitable number of senders 101 and/or recipients 103 to access suitable types of computing services provided by the computing system 100.

The client devices 102 can each include suitable hardware/software to provide various computer applications and/or services. For example, as shown in FIG. 1, the client devices 102 can each execute suitable instructions to provide an email client 116 configured to compose, view, forward, or perform other suitable operations. In certain embodiments, the email client 116 can be a standalone email client application, such as Microsoft Outlook®. In other embodiments, the email client 116 can also be a web-based email client such as Gmail provided by Google Inc., of Mountain View, Calif.

In the illustrated example, the email client 116 on the client device 102 of the sender 101 is shown facilitating composition of an example email 114 by the sender 101. As shown in FIG. 1, the email 114 is from "John@newco.com" to multiple recipients 103, such as "Danny@newco.com." The email 114 can include a header 117 with various fields such as "From:," "To:," and "Re:," and an email body 118 containing text data (i.e., "Hi everyone, Please find a copy of the patent doc attached to this email") and an attachment 119 (i.e., "Patent Doc"). In other examples, the email body can also include image, video, or other suitable types of data. The email client 116 can include a "Send" button actuation of which can cause the email client 116 to transmit the email 114 from the client device 102 to the email server 105 destined to the recipients identified in the "To:" field.

As shown in FIG. 1, the email server 105 can include a message handler 160 that is configured to configured to implement various functions of Internet Message Access Protocol ("IMAP"), Post Office Protocol ("POP"), Simple Mail Transfer Protocol ("SMTP"), or other suitable email protocols. As such, the message handler 160 can be configured to facilitate various messaging operations of the email client 116 on the client device 102 of the sender 101 and email clients 116 (not shown) on the client devices 102 of the recipients 103. For example, as shown in FIG. 1, the message handler 160 can be configured to receive the email 114 from the client device 102 of the sender 101 and forward a copy of the email 114 to an inbox 113 corresponding to the individual recipients 113 at the network storage 112 according to, for instance, the values identified in the "To:" field. In certain implementations, the message handler 160 can also be configured to provide notifications 122 indicating reception of the email 114 to the client devices 102a-102c corresponding to the recipients 103a-103c in a push mode. In other implementations, the message handler 160 can be configured to provide the notifications 122 in a pull mode, for instance, in response to queries from the client devices 102a-102c. In other examples, the message handler 160 can also be configured to provide automated responses, message recall, and/or other suitable functionalities.

As shown in FIG. 1, the email server 105 can also include a content replicator 162 that is configured to enable peer-to-peer email content replication and synchronization in the computing system 100. The content replicator 162 can be configured to track a synchronization status of email content in the email 114 and, when a local copy of the email content 120 is available on a client device 102, instruct another client device 102 to synchronize the email content 120 in a peer-to-peer fashion with the client device 102 that already has a copy of the email content 120, instead of obtaining a copy of the email content 120 from the email server 105. As such, a load of network bandwidth and compute resources placed on the email server 105 can be reduced, as discussed in more detail below with reference to FIGS. 2A-2E.

FIGS. 2A-2E are schematic diagrams illustrating certain hardware/software components of the computing system 100 of FIG. 1 during operations of peer-to-peer email content replication and synchronization in accordance with embodiments of the disclosed technology. In FIGS. 2A-2E, only certain components of the computing system 100 of FIG. 1 are shown for clarity. Also, in FIGS. 2A-2E and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
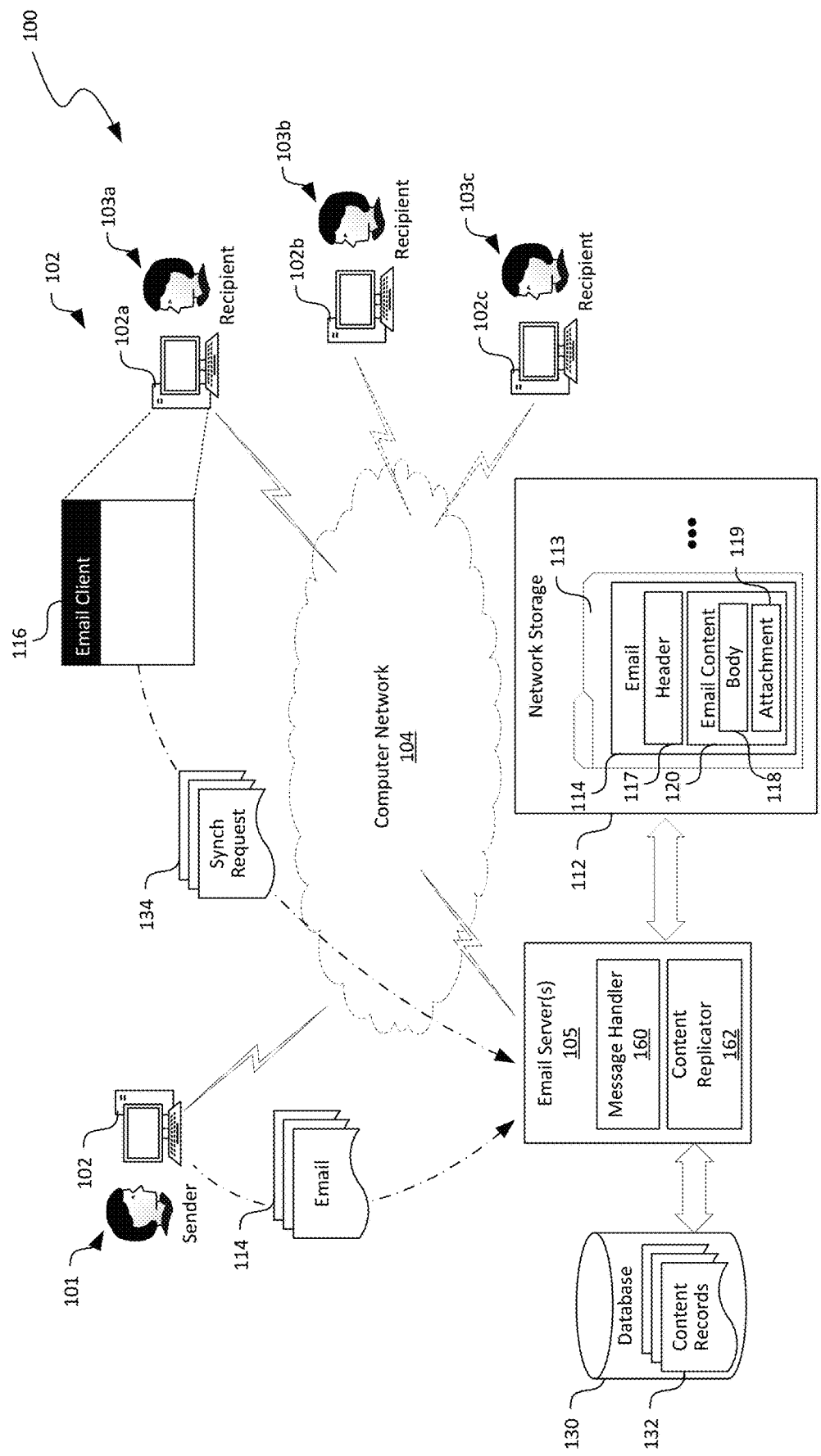
FIGS. 2A-2E are schematic diagrams illustrating certain hardware/software components of the computing system of FIG. 1 during operations of peer-to-peer email content replication and synchronization in accordance with embodiments of the disclosed technology.

As shown in FIG. 2A, the content replicator 162 can be operatively coupled to a database 130 containing content records 132 corresponding to email content 120 in various emails 114 in the network storage 112. In certain implementations, the content replicator 162 can be configured to detect reception of the email 114 and in response, assign a replica identification (or "Replica ID") to the email content 120 of the received email 114. The replica ID can be an alphanumerical, numerical, or other suitable types of string that uniquely identifies the email content 120. The content replicator 162 can also be configured to create and store a corresponding content record 132 in the database 130 for tracking a synchronization status of the email content 120 assigned with the replica ID. In the illustrated embodiment, the email content 120 includes a body 118 and attachment 119 of the email 114. In other embodiments, the email content 120 of the email 114 can include other suitable types of content items.

Upon receiving the notifications 122 (FIG. 1), an email client 116 on the first client device 102a can be configured to transmit a synchronization request (shown in FIG. 2A as "Synch Request 134") to the email server 105 in response to the notification 122 (FIG. 1) via the computer network 104 for synchronizing, for instance, emails 114 in the inbox 113 at both the network storage 112 and the first client device 102a. In the illustrated example, the second and third client devices 102b and 102c of the second and third recipients 103b and 103c are offline from the computer network 104 (indicated by the dashed connections to the computer network 104). As such, neither of the second and third client device 102b and 102c can transmit a corresponding synchronization request to the email server 105.

Figure 2B:
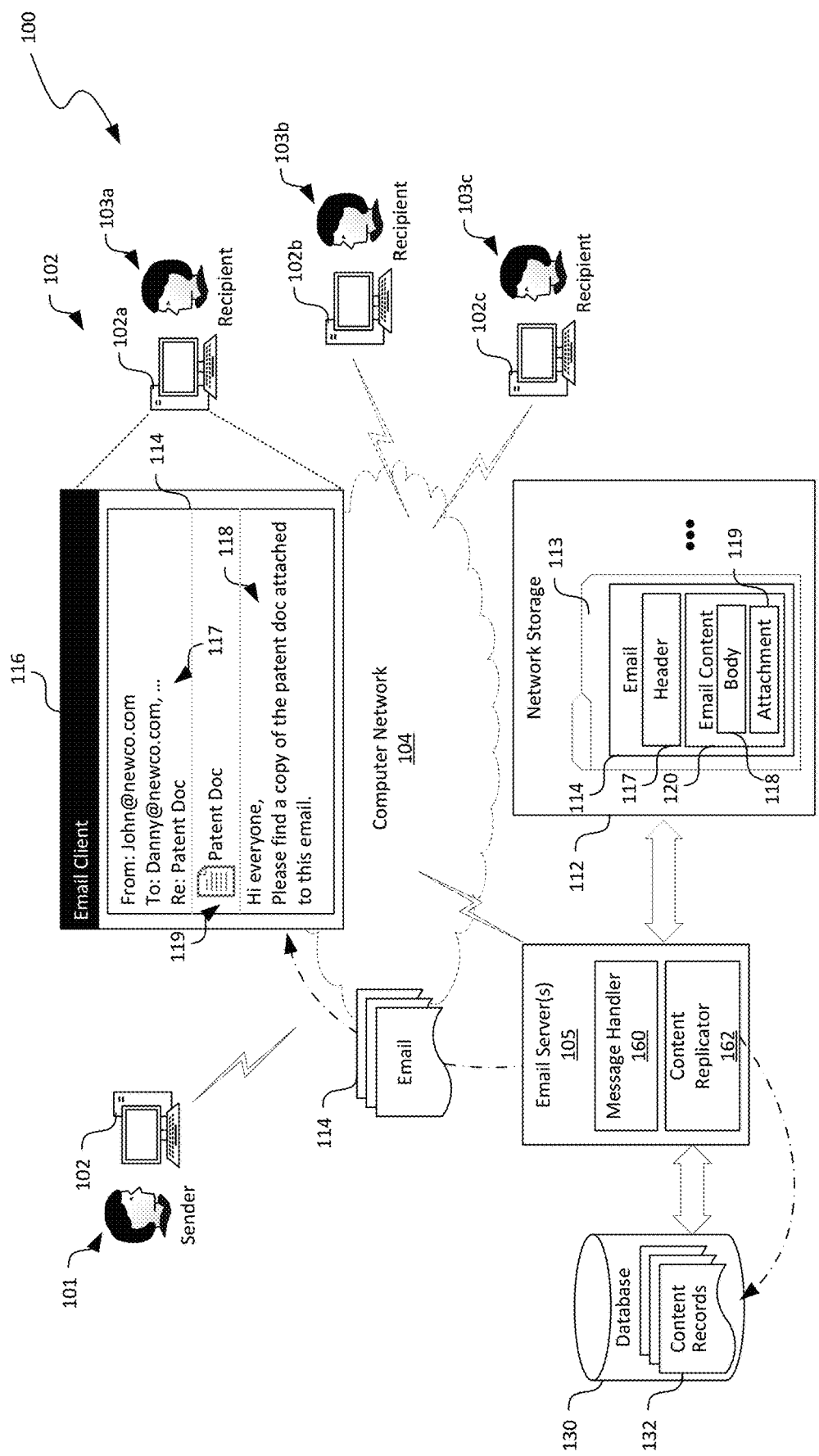

In response to receiving the synchronization request 134 from the first client device 102a, the content replicator 162 can be configured to query the database 130 for a content record 132 corresponding to the email content 120 of the email 114. Based on the queried content record 132, the content replicator 132 can be configured to determine whether a copy of the email content 120 of the email 114 is present on any one of the client devices 102a-102c. As shown in FIG. 2B, in response to determining that a copy of the email content 120 of the email 114 is not present on any of the client devices 102a-102c, the content replicator 162 can be configured to instruct the message handler 160 to transmit, via the computer network 104, a complete copy of the email content 120 of the email 114 to the first client device 102a. Upon receiving the email 114, the email client 116 at the first client device 102a can render and surface the received copy of the email content 120 to the first recipient 103a via a suitable user interface.

Upon transmitting a complete copy of the email 114 to the client device 102 of the first recipient 103a, the content replicator 162 can be configured to also update the corresponding content record 132 in the database 130 with data that indicates that a copy of the email content 120 of the email 114 is now present on the first client device 102a of the first recipient 103a. The content replicator 162 can also be configured to update the content record 132 with an IP address of the first client device 102a, a URL of the email content 120 on the first client device 102a, a device identification of the first client device 102a, or other suitable information. Using the updated content record 132, the content replicator 162 can be configured to enable peer-to-peer synchronization of the email content 120 of the email 114, as discussed in more detail below with reference to FIGS. 2C-2E.

Figure 2C:
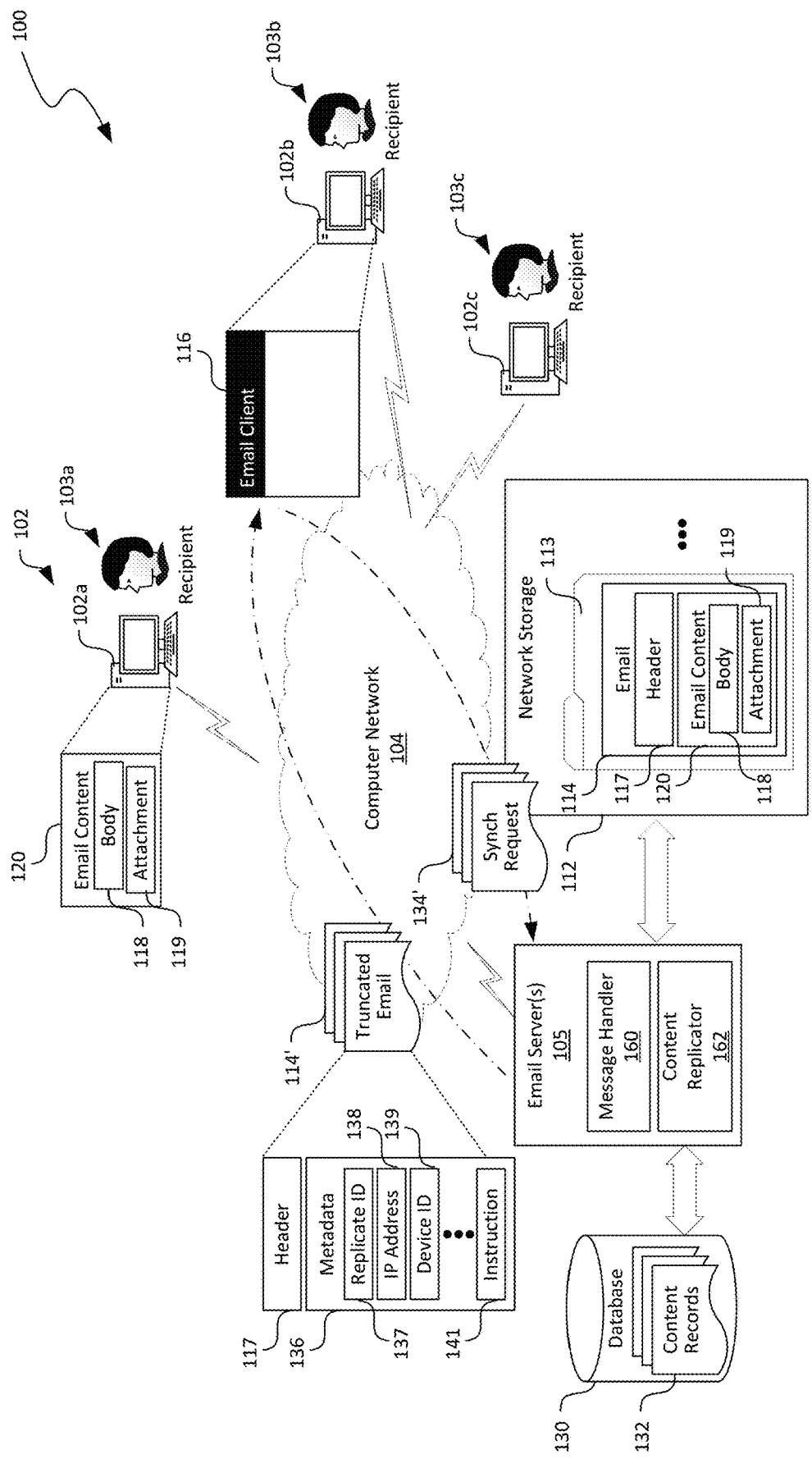

As shown in FIG. 2C, another email client 116 at the second client device 102b can transmit another synchronization request (shown as "Synch Request 134") to the email server 105 for synchronizing the inbox 113 of the second recipient 103b at the network storage 112 and a corresponding email folder on the second client device 102b. In response to receiving the synchronization request from the second client device 102b, the content replicator 162 can be configured to query the database 130 for the corresponding content record 132. In the illustrated example, the content record 132 can indicate that a copy of the email content 120 is already present on the first client device 102a. In response, instead of instructing the message handler 160 to transmit a complete copy of the email 114 to the second client device 102b, the content replicator 162 can generate and instruct the message handler 160 to transmit a truncated email 114' to the second client device 102b. In the illustrated example, the truncated email 114' can include a header 117 of the email 114 and metadata 136 representing a replicate identification 137 of the email content 120, an IP address of the first client device 102a, a device identification 139 of the first client device 102a, and/or other suitable information. The metadata 136 can also include an instruction 141 to the first client device 102*a* to retrieve a copy of the email content 120 corresponding to the replicate ID 137 via a peer-to-peer communications channel between the first and second client devices 102*a* and 102*b*.

Figure 2D:
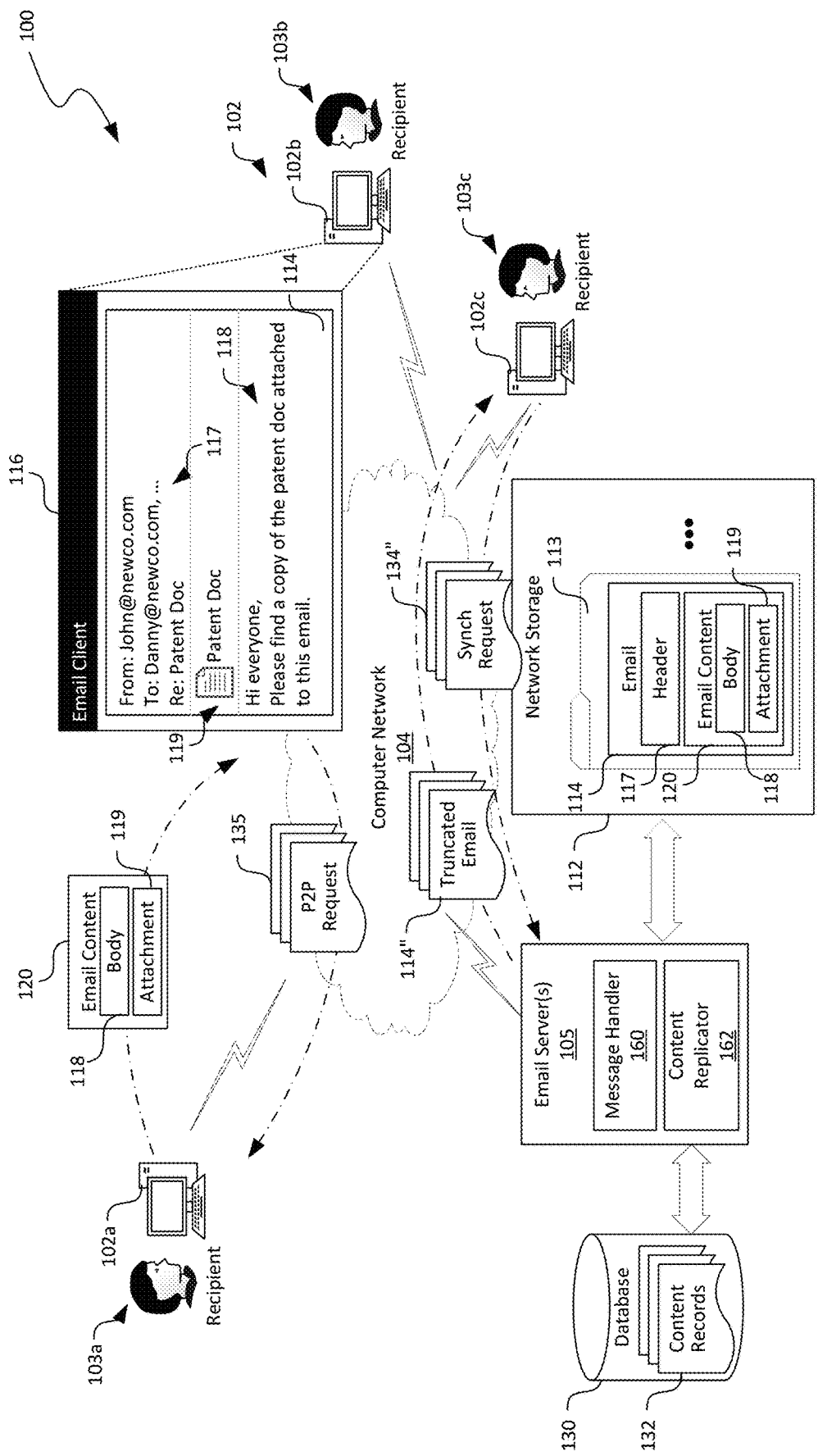

Upon receiving the truncated email 114', as shown in FIG. 2D, instead of receiving a copy of the email content 120 from the email server 105, the second client device 102*b* can establish a peer-to-peer communications channel by, for instance, transmitting a P2P request 135 to the first client device 102*a*. Upon suitable authentication, authorization, and/or other operations, a peer-to-peer communications channel between the first and second client devices 102*a* and 102*b* can be established. Via the established peer-to-peer communications channel, the second client device 102*b* can receive a copy of the email content 120 corresponding to the replica ID 137 (FIG. 2C) from the first client device 102*a*. The email client 116 on the second client device 102*b* can then combine the received copy of the email content 120 with other suitable portions (e.g., the header 117 shown in FIG. 2C) to generate, render, and surface a complete copy of the email 114 on the second client device 102*b* to the second recipient 103*b*.

Figure 2E:
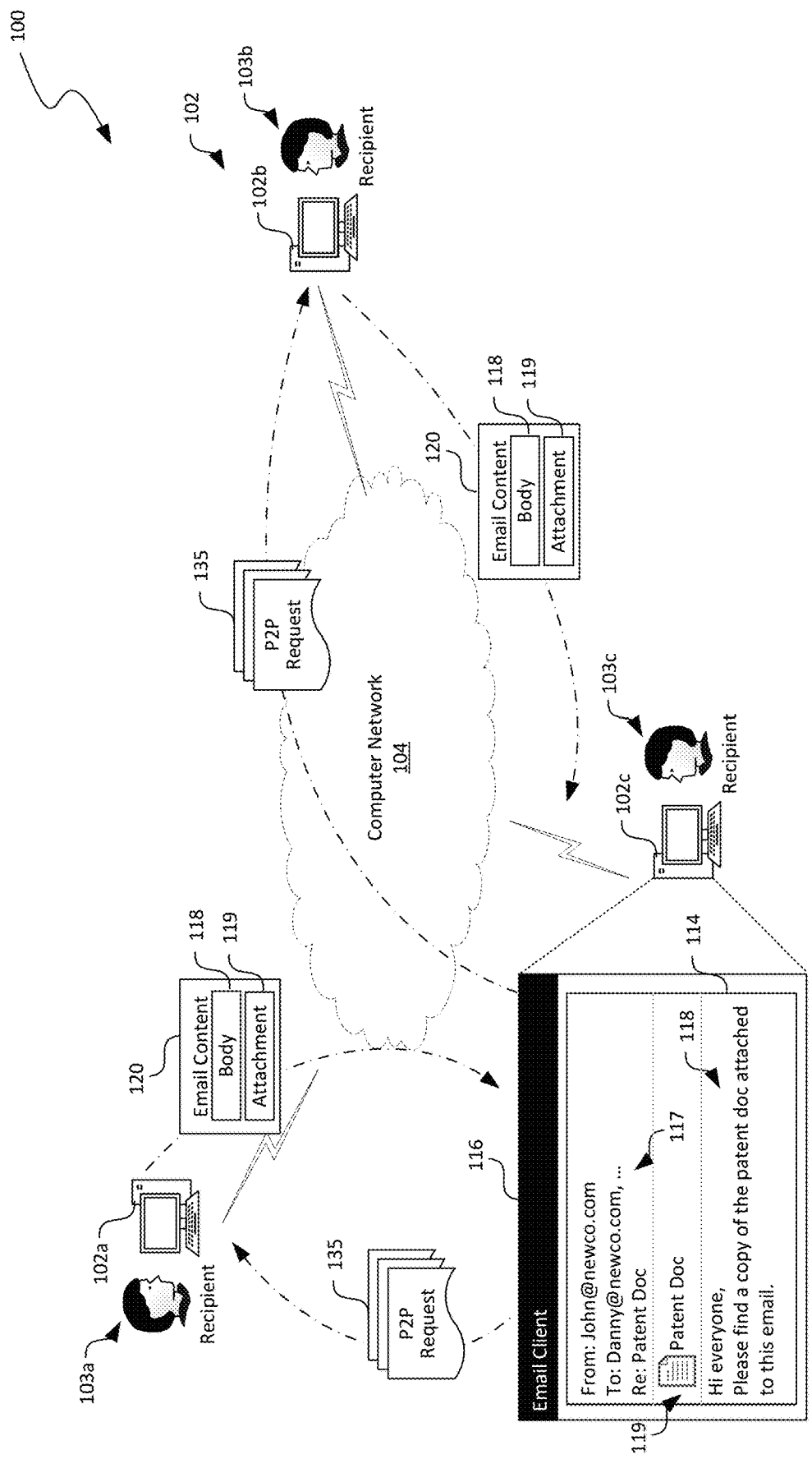

In certain implementations, the second client device 102*b* can also transmit a notification (not shown) to the email server 105 to indicate that another copy of the email content 120 is now available on the second client device 102*b*. In response, the content replicator 162 can be configured to update the corresponding content record 132 accordingly. Though FIG. 2D illustrates a peer-to-peer communications channel between only two client devices 102*a* and 102*b*, in other implementations, a client device 102 may receive a copy of the email content 120 from multiple other client devices 102. For example, as shown in FIG. 2D, upon receiving another synchronization request (shown as "Synch Request 134'") from the third client device 102*c*, the content replicator 162 can generate and transmit to the third client device 102*c* another truncated email 114" that identifies both the first and second client devices 102*a* and 102*b* as each having a copy of the email content 120. In response, as shown in FIG. 2E, the third client device 102*c* can establish a peer-to-peer communications channel with both the first and second client devices 102*a* and 102*b* to receive a copy of the email content 120 concurrently, serially, or in other suitable fashions. In other examples, the content replicator 162 (FIG. 2D) can be configured to select one or more of the first and second client devices 102*a* and 102*b* that individually have a copy of the email content 120 based on, for instance, availability, network bandwidth, and/or other suitable parameters of the first and second client devices 102*a* and 102*b*, and instruct the third client device 102*c* to initiate a peer-to-peer connection with the selected first or second client device 102*a* or 102*b* for retrieving a copy of the email content 120.

Several embodiments of the disclosed technology can thus improve efficiency of synchronizing the email 114 in the computing system 100 via peer-to-peer email content replication and synchronization among the client devices 102. As such, the client devices 102 can retrieve copies of the email content 120 from other peer client devices 102 instead of the email server 105. As such, a load of network bandwidth and compute resources placed on the email server 105 can be reduced. Thus, latencies related to email synchronization may be reduced to improve user experience with the email service.

As discussed above, the example operations described with reference to FIGS. 2A-2E are in the context of replicating and synchronizing email content 120 among different client devices 102*a*-102*c* of corresponding recipients 103*a*-103*c*. In other examples, similar replication and synchronization operations may also be performed to email content 120 of emails 114 of the sender 101. For instance, email content 120 of emails 114 in a "Sent Item" folder on the client device 102 of the sender 101 may be replicated from copies available from the first or second client device 102*a* or 102*b* of the first or second recipient 103*a* or 103*b* in the peer-to-peer fashion described above. In further examples, replication and synchronization of email content 120 to the third client device 102*c* of the third user 103*c* may also be based on a copy of the email content 120 available at the client device 102 of the sender 101.

Figure 3:
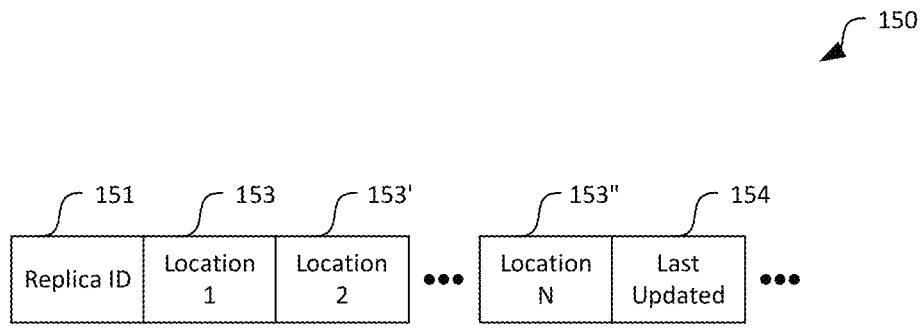
FIG. 3 is a schematic diagram illustrating an example data schema for an example content record in accordance with embodiments of the disclosed technology.

FIG. 3 is a schematic diagram illustrating an example data schema for a content record 132 in accordance with embodiments of the disclosed technology. As shown in FIG. 3, the content record 132 can include a replica ID field 151, one or more location fields 153, and a last updated field 154. Though particular fields are illustrated in FIG. 3, in other embodiments, the content record 132 can include additional and/or different fields.

The replica ID field can be configured to store a value representing a unique or distinct identification of email content 120 (FIG. 2A) of an email 114 (FIG. 2A). The location fields 153 can be configured to individually store a value representing a source at which a copy of the email content 120 may be retrieved. Example values can include an IP address of a client device 102 (FIG. 2A), a device identification of the client device 102, and/or other suitable information. The last updated field 154 can be configured to store a value representing a date/time at which the content record 132 is last updated.

Figure 4A:
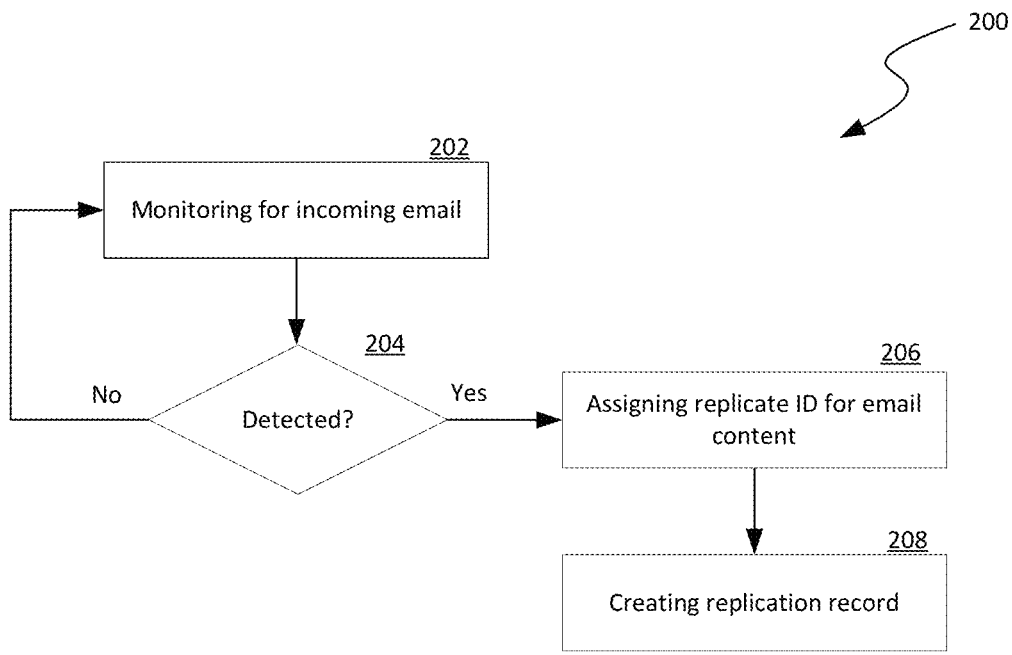
FIGS. 4A-4C are flowcharts illustrating processes of peer-to-peer email content replication and synchronization in accordance with embodiments of the disclosed technology.
Figure 4B:
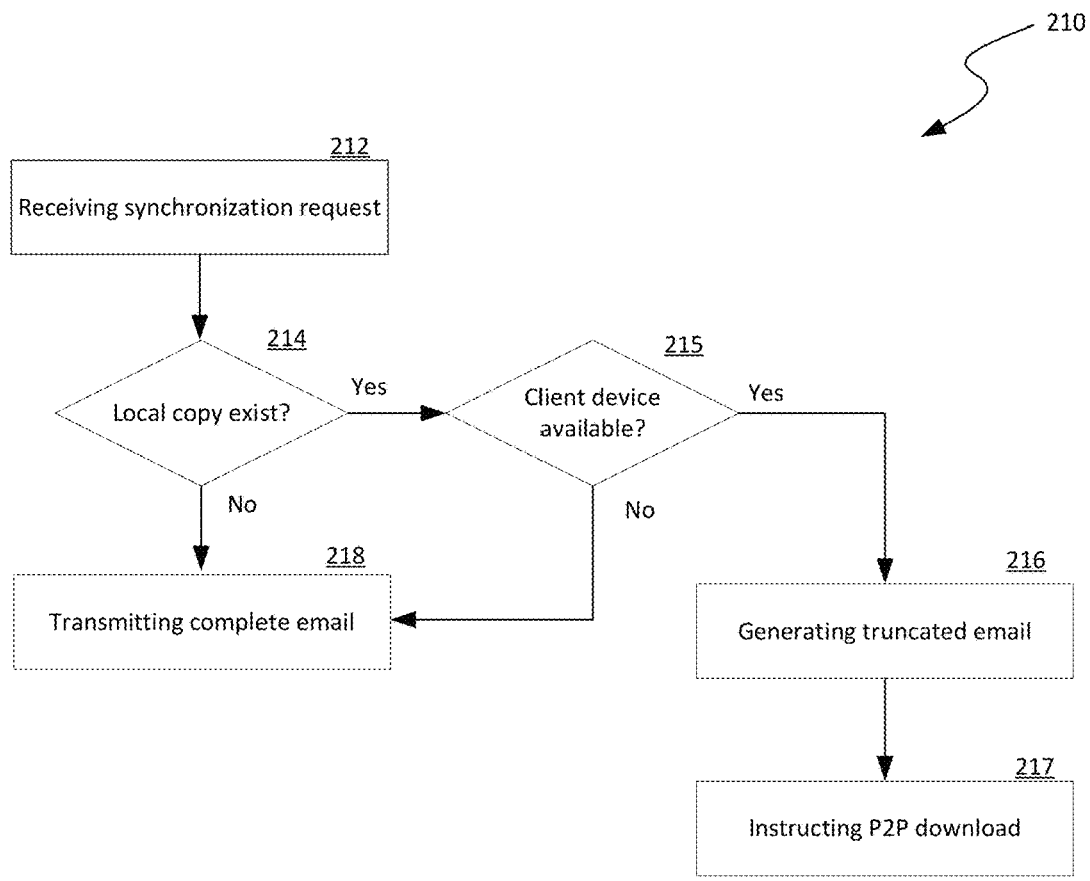
Figure 4C:
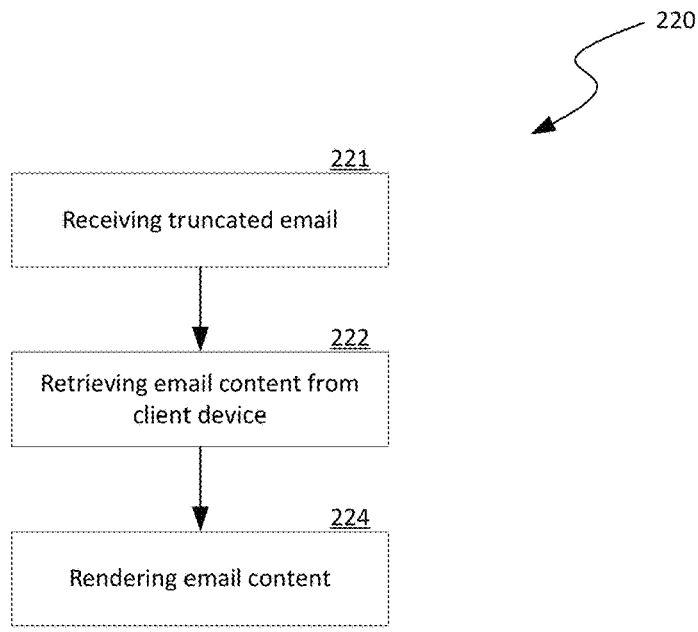

FIGS. 4A-4C are flowcharts illustrating processes of peer-to-peer email content replication and synchronization in accordance with embodiments of the disclosed technology. Though embodiments of the processes are described below in the context of the computing system 100 of FIG. 1, in other embodiments, the processes may be implemented in computing systems with additional and/or different components.

As shown in FIG. 4A, a process 200 can include monitoring for an incoming email at stage 202. The process 200 can then include a decision stage 204 to determine whether an incoming email is detected. In response to determining that an incoming email is not detected, the process 200 reverts to monitoring for incoming email at stage 202. Otherwise, the process 200 can proceed to assigning a replica ID to email content of the incoming email at stage 2016. The process 200 can then proceed to creating a content record for the email content at stage 208, as discussed in more detail above with reference to FIG. 2A.

As shown in FIG. 4B, a process 210 can include receiving a synchronization request from a client device at stage 212. The process 210 can then include a decision stage 214 to determine whether a local copy of email content of an email to be synchronized exist on one or more additional client devices. In response to determining that a local copy of the email content does not exist, the process 210 proceeds to transmitting a complete copy of the email to the client device at stage 218. In response to determining that a local copy of the email content does exist, the process 210 proceeds to another decision stage 215 to determine whether the other client device is available (e.g., online and accessible) at stage 215. In response to determining that the other client device is not available, the process 210 proceeds to transmitting a complete copy of the email at stage 218. Otherwise, the process 210 proceeds to generating a truncated email at stage 216 and instructing the client device to perform a peer-to-peer download of the email content from the other client device at stage 217, as described above in more detail with reference to FIGS. 2A-2E.

As shown in FIG. 4C, a process 220 can include receiving a truncated email from an email server at stage 221. The process 220 can then include identifying one or more client devices each having a local copy of the email content of an email to be synchronized and retrieving a copy of the email content in a peer-to-peer fashion at stage 222. The process 220 can then include rendering and surfacing the retrieved email content at stage 224, as described above in more detail with reference to FIGS. 2A-2E.

Figure 5:
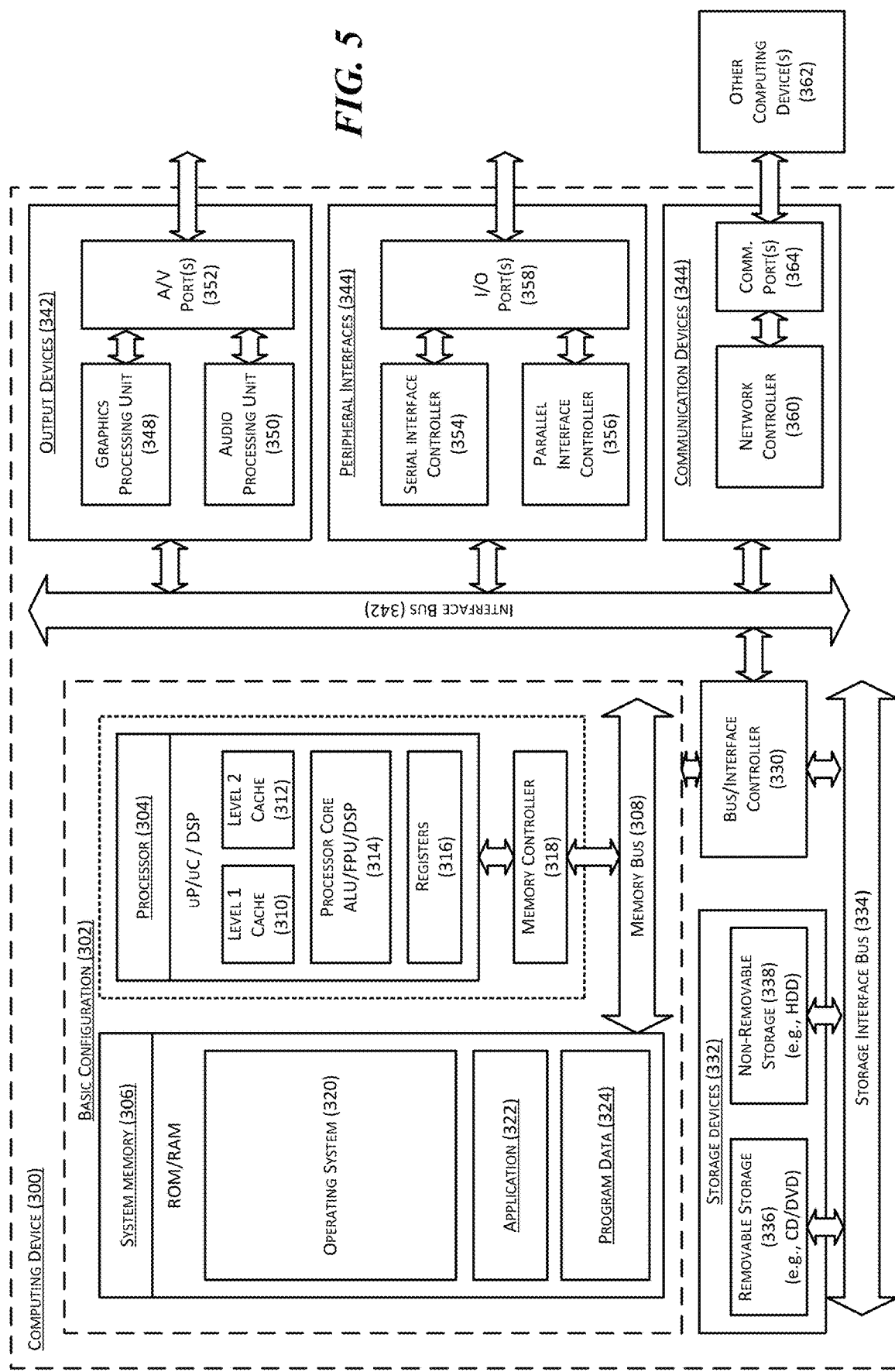
FIG. 5 is a computing device suitable for certain components of the computing system in FIG. 1.

FIG. 5 is a computing device 300 suitable for certain components of the distributed computing system 100 in FIG. 1. For example, the computing device 300 can be suitable for the client device 102, the email server 105, and the file server 106 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of peer-to-peer email synchronization in a computing system with multiple client devices and an email server interconnected by a computer network, the method comprising:
   receiving, at the email server, a synchronization request to synchronize an email having email content between the email server and a first client device; and
   in response to receiving the synchronization request, at the email server,
      accessing a content record from a database to determine whether a copy of the email content of the email is present on any client device; and
      in response to determining that a copy of the email content of the email is present at a second client device, transmitting, to the first client device, a truncated email containing:
         metadata representing a replicate identification of the email content and identification of the second client device at which a copy of the email content is present; and
         an instruction to the first client device to retrieve a copy of the email content corresponding to the replicate identification via a peer-to-peer communications channel between the first and second client devices.

2. The method of claim 1 wherein the transmitted truncated email does not include a copy of the email content corresponding to the replicate identification.

3. The method of claim 1, further comprising:
   detecting, at the email server, reception of the email; and
   in response to detecting reception of the email,
   assigning the replication identification to the email content of the email; and
   creating and storing in the database, the content record containing data representing the assigned replication identification corresponding to the email content.

4. The method of claim 1, further comprising:
   in response to determining that a copy of the email content of the email is present at the second client device,
      determining whether the second client device is currently available; and
      in response to determining that the second client device is currently available, transmitting, to the first client device, the truncated email.

5. The method of claim 1, further comprising:
   in response to determining that a copy of the email content of the email is present at the second client device,
      determining whether the second client device is currently available; and
      in response to determining that the second client device is not currently available,
         transmitting a complete copy of the email content of the email to the first client device; and
         updating the content record to indicate that a copy of the email content of the email is now present on the first client device.

6. The method of claim 1, further comprising:
   in response to determining that a copy of the email content of the email is not present on any client device,
      transmitting a complete copy of the email content of the email to the first client device; and
      updating the content record to indicate that a copy of the email content of the email is now present on the first client device.

7. The method of claim 1, further comprising:
   subsequent transmitting the truncated email,
      receiving, from the first client device, a notification indicating that the first client device has received a copy of the email content of the email from the second client device; and
      in response to receiving the notification, updating the content record to indicate that a copy of the email content of the email is present on each of the first and second client devices.

8. The method of claim 1, further comprising:
   subsequent transmitting the truncated email,
      receiving, from the first client device, a notification indicating that the first client device has received a copy of the email content of the email from the second client device;
      in response to receiving the notification, updating the content record to indicate that a copy of the email content of the email is present on each of the first and second client devices; and
      upon receiving another synchronization request to synchronize the email between the email server and a third client device, at the email server,
         selecting one of the first or second client devices for synchronizing the email content with the third client device based on a current availability of the first and second client devices; and
         transmitting, to the third client device, another truncated email containing:
            metadata representing the replicate identification of the email content and identification of the selected one of the first or second client device; and
            an instruction to the third client device to synchronize the email content corresponding to the replicate identification via a peer-to-peer communications channel between the third client device with the one of the selected first or second client device.

9. The method of claim 1, further comprising:
   subsequent transmitting the truncated email,
      receiving, from the first client device, a notification indicating that the first client device has received a copy of the email content of the email from the second client device;
      updating the content record to indicate that a copy of the email content of the email is present on each of the first and second client devices; and
      in response to receiving another synchronization request to synchronize the email between the email server and a third client device, at the email server, transmitting, to the third client device, another truncated email containing metadata representing the replicate identification of the email content and identification of both the first and second client devices and an instruction to the third client device to synchronize the email content corresponding to the replicate identification via a peer-to-peer communications channel with each of the first and second client devices.

10. A computer server in a computing system having multiple client devices interconnected by a computer network to one another and to the computer server, comprising:

a processor; and a memory operatively coupled to the processor, the memory having instructions executable by the processor to cause the processor to:

upon receiving, from a first client device, a synchronization request to synchronize an email between the computer server and a first client device; and query a database having content records to determine whether a copy of email content of the email is already present on any of the multiple client devices; and in response to determining that a copy of the email content of the email is present at a second client device, transmit, to the first client device, data representing a replicate identification of the email content and identification of the second client device and an instruction to the first client device to retrieve a copy of the email content corresponding to the replicate identification via a peer-to-peer communications channel between the first and second client devices, without transmitting a copy of the email content from the computer server to the first client device.

11. The computer server of claim 10 wherein the memory has additional instructions executable by the processor to cause the computer server to:

in response to determining that a copy of the email content of the email is present at the second client device, determine whether the second client device is currently available; and in response to determining that the second client device is currently available, transmit, to the first client device, the truncated email.

12. The computer server of claim 10 wherein the memory has additional instructions executable by the processor to cause the computer server to:

in response to determining that a copy of the email content of the email is present at the second client device, determine whether the second client device is currently available; and in response to determining that the second client device is not currently available, transmit a complete copy of the email content of the email to the first client device; and update the content record to indicate that a copy of the email content of the email is now present on the first client device.

13. The computer server of claim 10 wherein the memory has additional instructions executable by the processor to cause the computer server to:

in response to determining that a copy of the email content of the email is not present on any client device, transmit a complete copy of the email content of the email to the first client device; and update the content record to indicate that a copy of the email content of the email is now present on the first client device.

14. The computer server of claim 10 wherein the memory has additional instructions executable by the processor to cause the computer server to:

subsequent transmitting the truncated email, receive, from the first client device, a notification indicating that the first client device has received a copy of the email content of the email from the second client device; and in response to receiving the notification, update the content record to indicate that a copy of the email content of the email is present on each of the first and second client devices.

15. The computer server of claim 10 wherein the memory has additional instructions executable by the processor to cause the computer server to:

subsequent transmitting the truncated email, receive, from the first client device, a notification indicating that the first client device has received a copy of the email content of the email from the second client device;

in response to receiving the notification, update the content record to indicate that a copy of the email content of the email is present on each of the first and second client devices; and upon receiving another synchronization request to synchronize the email between the computer server and a third client device, at the computer server, select one of the first or second client devices for synchronizing the email content with the third client device based on a current availability of the first and second client devices; and transmit, to the third client device, another truncated email containing:

metadata representing the replicate identification of the email content and identification of the selected one of the first or second client device; and an instruction to the third client device to synchronize the email content corresponding to the replicate identification via a peer-to-peer communications channel between the third client device with the one of the selected first or second client device.

16. The computer server of claim 10 wherein the memory has additional instructions executable by the processor to cause the computer server to:

subsequent transmitting the truncated email, receive, from the first client device, a notification indicating that the first client device has received a copy of the email content of the email from the second client device;

update the content record to indicate that a copy of the email content of the email is present on each of the first and second client devices; and in response to receiving another synchronization request to synchronize the email between the computer server and a third client device, transmit, to the third client device, another truncated email containing metadata representing the replicate identification of the email content and identification of both the first and second client devices and an instruction to the third client device to synchronize the email content corresponding to the replicate identification via a peer-to-peer communications channel with each of the first and second client devices.

17. A method of peer-to-peer email synchronization in a computing system with multiple client devices and an email server interconnected by a computer network, the method comprising:
    transmitting, from a first client device to the email server, a synchronization request to synchronize an email between the email server and the first client device; and
    receiving, at the first client device, a reply from the email server, the reply containing data representing:
        a replicate identification of email content of the email and identification of a second client device at which a copy of the email content is present; and
        an instruction to retrieve a copy of the email content corresponding to the replicate identification via a peer-to-peer communications channel between the first and second client devices; and
    in response to receiving the reply,
        establishing a peer-to-peer communications channel with the second client device;
        downloading a copy of the email content of the email from the second client device instead of the email server; and
        rendering and surfacing the downloaded email content in an email client on the first client device to a user.

18. The method of claim 17 wherein:
    the reply contains additional data identifying a third client device at which a copy of the email content is also present; and
    downloading a copy of the email content includes downloading a copy of the email content from both the second and third client devices instead of the email server.

19. The method of claim 17, further comprising, upon completion of downloading the copy of the email content, transmitting, to the email server, a notification indicating that a copy of the email content of the email corresponding to the replication identification is now present on the first client device.

20. The method of claim 17, further comprising:
    upon completion of downloading the copy of the email content, transmitting, to the email server, a notification indicating that a copy of the email content of the email corresponding to the replication identification is now present on the first client device; and
    subsequently, transmitting a copy of the email content to a third client device via another peer-to-peer communications channel.

* * * * *